United States Patent
Thoma et al.

(10) Patent No.: US 10,189,306 B2
(45) Date of Patent: Jan. 29, 2019

(54) REAR HUB AND BICYCLIC AXLE

(71) Applicant: Canyon Bicycles GmbH, Koblenz (DE)

(72) Inventors: Vincenz Thoma, Koblenz (DE); Lutz Scheffer, Garmisch-Partenkirchen (DE); Lorenz Lay, Koblenz (DE)

(73) Assignee: Canyon Bicycles GmbH, Koblenz (DE)

( * ) Notice: Subject to any disclaimer, the term of this patent is extended or adjusted under 35 U.S.C. 154(b) by 153 days.

(21) Appl. No.: 15/238,858

(22) Filed: Aug. 17, 2016

(65) Prior Publication Data

US 2017/0050465 A1    Feb. 23, 2017

(30) Foreign Application Priority Data

Aug. 18, 2015   (DE) .................... 20 2015 005 747 U

(51) Int. Cl.
| | |
|---|---|
| *F16D 41/24* | (2006.01) |
| *B60B 27/04* | (2006.01) |
| *F16D 41/36* | (2006.01) |
| *B60B 27/02* | (2006.01) |
| *B62K 23/02* | (2006.01) |
| *B60B 27/00* | (2006.01) |

(52) U.S. Cl.
CPC .......... *B60B 27/047* (2013.01); *B60B 27/023* (2013.01); *B60B 27/026* (2013.01); *B62K 23/02* (2013.01); *F16D 41/36* (2013.01); *B60B 27/00* (2013.01); *B60B 2900/311* (2013.01); *B60B 2900/531* (2013.01); *B60B 2900/551* (2013.01); *F16D 41/24* (2013.01)

(58) Field of Classification Search
CPC . B60B 27/00–27/065; B60B 2900/551; B60B 2900/311; B60B 2900/531; B62K 23/02; F16D 41/24; F16D 41/36
See application file for complete search history.

(56) References Cited

U.S. PATENT DOCUMENTS

| | | | | |
|---|---|---|---|---|
| 2,630,333 | A * | 3/1953 | Petersen | B62M 1/28 280/255 |
| 4,702,486 | A * | 10/1987 | Tsuchie | F16D 41/24 192/41 A |
| 5,004,083 | A * | 4/1991 | Lohman | B62L 1/00 192/217.1 |
| 5,676,227 | A | 10/1997 | Hügi | |
| 7,111,719 | B1 * | 9/2006 | Sheu | F16D 41/36 192/54.5 |
| 2015/0060224 | A1 | 3/2015 | Lee | |
| 2015/0202919 | A1 * | 7/2015 | Koshiyama | B60B 27/023 192/64 |

FOREIGN PATENT DOCUMENTS

| | | |
|---|---|---|
| CA | 2078053 A1 | 3/1994 |
| DE | 9419357.6 U1 | 3/1995 |
| DE | 202014001591 U1 | 5/2014 |
| EP | 1777427 A2 | 4/2007 |
| EP | 2722549 A2 | 4/2014 |

* cited by examiner

*Primary Examiner* — Ramya P Burgess
*Assistant Examiner* — Lillian T Nguyen
(74) *Attorney, Agent, or Firm* — The Webb Law Firm

(57) ABSTRACT

A rear hub for mountain bikes includes a hub body and a sprocket carrier rotatably provided on a hub axle. The hub body is coupled with the sprocket carrier via a freewheel mechanism. By providing a decoupling mechanism, it is possible to decouple the sprocket carrier from the hub body.

27 Claims, 2 Drawing Sheets

REAR HUB AND BICYCLIC AXLE

CROSS-REFERENCE TO RELATED APPLICATION

This application claims priority to German Patent Application No. 20 2015 005 747.0 filed Aug. 18, 2015, the disclosure of which is hereby incorporated in its entirety by reference.

BACKGROUND OF THE INVENTION

Field of the Invention

The invention relates to a rear hub suited in particular for mountain bikes and, in a particularly preferred embodiment, for downhill mountain bikes. The invention further relates to a corresponding bicycle axle.

Description of Related Art

With mountain bikes having a sprung rear wheel and a derailleur system, a rear wheel suspension structure is often chosen which stabilizes the suspension system upon acceleration, so that the wheel load change causes no compression of the spring (so-called anti-squat). In this regard it is known to use the chain pulling force for stabilization, so that a spring compression at the rear frame is prevented at least in part. In particular with downhill mountain bikes a structure is often chosen in which the wheel deflection trajectory of the rear wheel axle starts relatively flatly in the rearward direction. Thereby, the sprung rear wheel can be deflected better by large obstacles. Both the increase in chain pulling force and a corresponding wheel deflection trajectory cause an increase in the distance between the bottom bracket and the rear hub when the rear wheel is deflected. Since the pawls of the freewheel in the rear wheel couple the chain with the latter for rotation therewith, the increase in the distance between the bottom bracket and the rear hub results in reverse rotation of the chain blade and thus to a reverse rotation of the pedals. Since the cyclist represents the main mass of the system and the weight of the cyclist bears on the pedals in particular while riding off-road, such a pedal kickback is perceived by the cyclist as a spring hardening. In this moment, the chain tension prevents a free deflection of the rear frame structure and/or slipping occurs at the rear wheel's point of contact with the ground, since the rear wheel is driven abruptly by the chain. As a result, ground contact may be reduced. Further, the lateral guiding of the rear wheel is affected, i.e. the directional stability decreases.

SUMMARY OF THE INVENTION

It is an object of the invention to improve the driving behavior of mountain bikes in particular at the moment of the suspension system deflecting.

The rear hub of the present invention is suited in particular for mountain bikes and, as is particularly preferred, for downhill mountain bikes. The rear hub includes a hub body rotatably supported on the hub axle and a sprocket carrier also rotatably supported on the hub axle. Typically, the sprocket carrier is connected with the sprocket cluster including a plurality of sprockets. Further, a freewheel mechanism is provided for coupling the hub body with the sprocket carrier. The freewheel is a conventional freewheel which transmits force from the sprocket to the hub body during pedaling, while, without pedaling, the hub body is free to rotate. With such freewheel mechanisms, the above described problem of pedal kickback exists. According to the invention a decoupling element is provided for decoupling the hub element and the sprocket support. By actuating or activating the decoupling element, force transmission between the hub body and the sprocket carrier is avoided or interrupted. Due to the present invention, if the decoupling element is actuated or activated e.g. in downhill sections, no pedal kickback will occur. In this regard, it is possible to achieve improved grip. This results in a better lateral guiding of the rear wheel and thus in an improvement in directional stability.

A conventional freewheel mechanism has two freewheel elements. The two freewheel elements cooperate such that force transmission is effected in one sense of rotation and no force transmission is effected in the other sense of rotation of the freewheel elements relative to each other. In the latter sense of rotation the two freewheel elements slip. For example, one of the freewheel elements has a toothing and the other freewheel element has a plurality of pawls. Similarly, the two freewheel elements may be axially meshing gears, one of which is displaceable in the axial direction and spring-loaded. Due to the decoupling element of the present invention the two freewheel elements are decoupled such that no force transmission occurs in both senses of rotation of the freewheel elements relative to each other. This may be achieved in particular by disengaging the two freewheel elements by means of the decoupling element. In particular, the decoupling element increases the distance between the two freewheel elements for a decoupling of the hub body and the sprocket carrier.

In this regard it is possible, for example, to realize a disengagement of the pawls by the decoupling element in a freewheel mechanism with pawls. For example, the decoupling element may disengage a pawl carrier (1. freewheel element) from a toothed disk (2. freewheel element) or the distance between the pawl carrier and the toothed disc may be increased so that the pawls no longer engage into the toothed disc.

It is particularly preferred that at least one annular gear of the freewheel mechanism has axially arranged teeth. A corresponding annular gear thus has the toothing on an end face. This annular gear can cooperate with pawls. It is particularly preferred that the annular gear (1. freewheel element) cooperates with a second annular gear (2. freewheel element), wherein at least one of the two annular gears is spring-loaded. Such an axial freewheel is described e.g. in DE 9 419 357. With such an axial freewheel it is preferred that, for decoupling, the decoupling element displaces at least one of the two annular gears in particular in the axial direction. Due to the distance between the two annular gears or of the one annular gear from the pawls, a decoupling of the hub body and the sprocket carrier is achieved.

It is particularly preferred that, for decoupling, the decoupling element is connected with an actuating element. The latter is preferably arranged on the bicycle handlebar. In this case, the actuation of the decoupling element, i.e. in particular a displacement of an annular gear, may be effected electrically and/or hydraulically. Specifically, a cable pull may also be provided as the actuating element. If an electric actuating element is provided, an axial displacement of the annular gear may be effected e.g. by means of a spindle drive. Providing an electric actuating element is preferred in particular in connection with electrically actuable switching elements.

Preferably, the rear hub has an axle that is in particular designed as a quick-release axle. The axle has an axle body, the axle body forming a cavity. The latter serves to fix the hub body and the sprocket carrier to dropout ends of a bicycle rear frame structure. In this regard, the axle may be designed as an axle with an eccentric element, with the dropout ends then being slotted, for example, so that the axle may be inserted while the axle is arranged within the rear hub. With quick-release axles, these are inserted to fasten the rear hub to the rear frame structure, after the rear hub has been positioned between the dropout ends. Therefore, the dropout ends do not have to be slotted, but may have bores. In this case, the quick-release axle is inserted through a bore in the form of a throughbore and through the rear hub and is screwed into a thread in the other dropout end. Fixing is performed by screwing the axle into the thread using a tool such as an Allen wrench or by providing an eccentric.

It is particularly preferred that the axle has a cavity for receiving the decoupling element. In this preferred embodiment the decoupling element for the decoupling of the hub body and the sprocket carrier is preferably arranged at least partly inside the axle.

Preferably the decoupling element includes at least one connecting element. Upon actuation of the decoupling element, the connecting element causes an in particular axial displacement of an annular gear of the freewheel mechanism designed preferably as an axial freewheel. Preferably, the at least one connecting element is pivoted when the decoupling element is actuated. In this regard it is preferred that the connecting element is adapted to be pivoted from a rest position into an actuation position by actuating the actuating element. In the actuation position, preferably one of the annular gears is displaced in the axial direction.

A pivoting of the at least one connecting element may be achieved by the connecting element being provided with a toothing which meshes with a toothed rack. By displacing the toothed rack the at least one connecting element is pivoted. It is preferred that the decoupling element has a displacement element. The displacement element is connected with at least one connecting element, with a displacement of the displacement element causing the at least one connecting element to pivot. The displacement element may be a toothed rack that engages a toothing of the connecting element. It is preferred that the displacement element is displaceably arranged in the cavity of the axle. In this regard, the displacement element is displaced preferably by means of the actuating element. The actuating element causes the displacement of the displacement element e.g. by means of a cable pull.

Instead of designing the displacement element as a toothed rack or the like, it is particularly preferred that a displacement of the displacement element also displaces the at least one connecting element. In this case, the displacement element is pushed against an abutment surface. This causes a pivoting of the at least one connecting element.

It is particularly preferred that the axle has at least one opening so as to allow a pivoting of the at least one connecting element to the actuation position. The opening, which is arranged in particular in the shell surface of the hollow axle, thus allows the at least one connecting element to be pivoted from the circumferential surface of the axle that is defined by the shell surface. The at least one connecting element, preferably in its rest position, is arranged such that it is situated in the at least one opening. Thus, in this embodiment, the connecting element preferably does not or only slightly protrude beyond the outer shell surface of the axle. Here, a lateral surface of the opening serves as an abutment surface for the connecting element. By a corresponding displacement of the connecting element, this surface causes the connecting element to pivot out.

It is further preferred that the displacement element is connected with a spring element. The displacement element is held in the rest position by means of the spring element which is an elastomeric body, a coil spring or the like, for example. It is preferred that the spring element is also arranged inside the hollow body of the axle. In particular, the spring element may be designed as a coil spring and surround the actuating element in the axle, the actuating element being rod-shaped, for instance.

The invention further relates to a bicycle axle, in particular a quick-release axle. The same serves to fix a hub body to dropout ends of a bicycle rear frame structure, the hub body being connected with a sprocket carrier via a freewheel mechanism. The bicycle axle has an axle body. The axle body may be connected on one side with a nut at one end with an eccentric at the other end. Typically, such axles are inserted into slot-shaped openings at the dropout ends of the bicycle rear frame structure. With quick-release axles, the axle body has a thread at one end. The opposite end may also be provided with an eccentric or with a lug for a tool such as an Allen wrench or the like. A cavity is provided in the axle body. According to the invention, a decoupling element is provided in the cavity for decoupling the hub body and the sprocket carrier. The bicycle axle is developed in an advantageous manner as described above in the context of the rear hub.

The invention will be described in detail hereunder with reference to a preferred embodiment and to the accompanying drawings.

DESCRIPTION OF THE INVENTION

Figure 1:
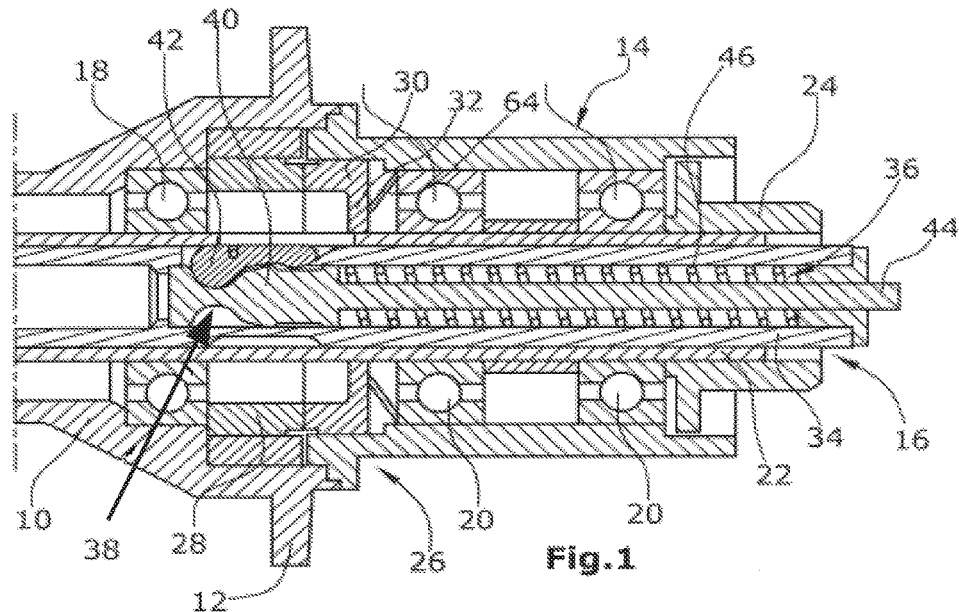
FIG. 1 is a schematic sectional view of a rear hub with a freewheel mechanism in a coupled state.
Figure 2:
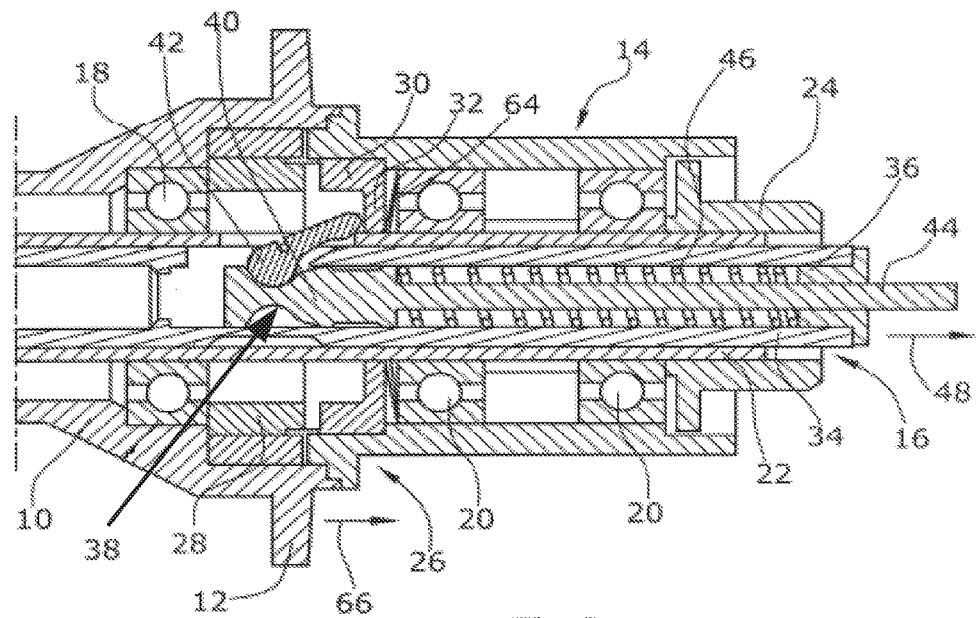
FIG. 2 is a schematic sectional view of the rear hub in FIG. 1 with the freewheel mechanism in a decoupled state.

A rear hub includes a hub body 10 which is visible only in part in FIGS. 1 and 2. In the embodiment illustrated, spokes are connected with protrusions 12 of the hub body 10. Further, the rear hub has a sprocket carrier 14. Both the hub body 10 and the sprocket carrier 14 are rotatably supported on a hub axle 16. In this regard, the hub body 10 is rotatably supported on the hub axle 16 by ball bearings 18 on the right in FIG. 1, as well as by further ball bearings not illustrated. The sprocket support is rotatably arranged on the hub axle 20 by means of a pair of ball bearings 20. To facilitate assembly, the hub axle 16 is surrounded by a sleeve 22 in the assembled state. The axle 16, which in a preferred embodiment is a quick-release axle, is inserted into the sleeve 22 for assembly. Friction locking exists between the hub axle 16 and the sleeve 22. On the right side in FIGS. 1 and 2, the sleeve 22 is connected with a sealing element 24. This element prevents the intrusion of dirt.

A freewheel mechanism 26 is provided for the connection of the hub body 10 with the sprocket carrier 14. In the embodiment illustrated, the freewheel mechanism 26 is an axial freewheel as described e.g. in DE 9 419 357. The axial freewheel has a spur-type annular gear 28 fixed in the hub body 10. In the embodiment illustrated, the annular gear 28 is not displaceable in the axial direction. A further annular gear 30 is arranged inside the sprocket carrier. The annular gear 30 is axially displaceable to form the freewheel. To guarantee a secure engagement of the two end faces of the annular gears 28, 30, a leaf spring 32 is provided which pushes the axially displaceable annular gear 30 against the annular gear 28 fixed in the hub body 10.

In the embodiment of the present invention illustrated, the axle 16 is hollow and as such has a sleeve-shaped axle body 34. The axle body 34 forms a cavity 36. A decoupling element 38 is arranged in the cavity 36. The decoupling element 38 includes a displacement element 40. Distributed over the circumference, at least three connecting elements 42 are pivotably connected with the displacement element 40. Further, the displacement element 40 is fixedly connected with an actuating element 44 in the form of a rod or a cable pull. The cable pull 44 may be connected with a corresponding actuating lever or, in other words, an actuating mechanism which is arranged in particular on the handlebar of the bicycle. In the embodiment illustrated, the actuating element 44 is surrounded by a spring element 46 in the form of a coil spring.

In FIG. 1, the decoupling element 38 is illustrated in a coupled position, i.e. in a position in which the two annular gears 28, 30 are connected with each other. In this position the decoupling element or the connecting elements 42 of the decoupling element 38 are in a rest position. Force transmission or the function of the freewheel is as in conventional bicycles.

In the position illustrated in FIG. 2, the two annular gears 28, 30 are decoupled. The decoupling element 38 or in particular the connecting elements 42 are in the actuation position. In this position no force transmission occurs between the two annular gears 28, 20.

Figure 3:
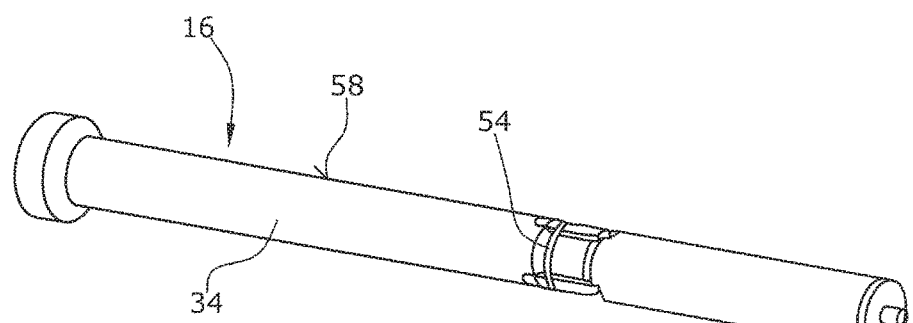
FIG. 3 is a schematic perspective view of a quick-release axle with connecting elements in a rest position.
Figure 4:
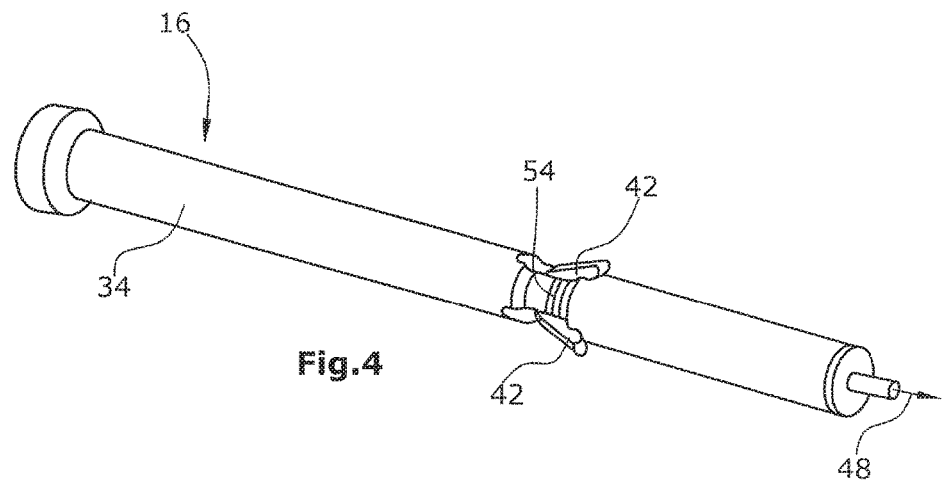
FIG. 4 is a schematic perspective view of a quick-release axle with connecting elements in an actuation position.
Figure 5:
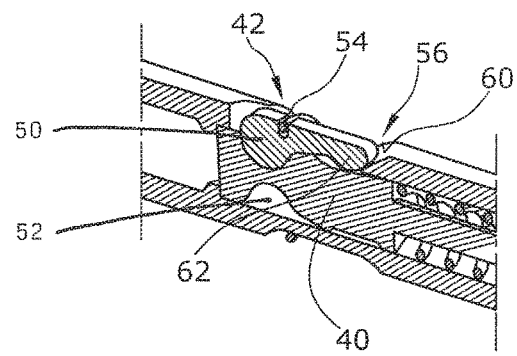
FIG. 5 is a schematic sectional view of the decoupling element.

Correspondingly, the axle itself is illustrated in the coupled or rest position in FIG. 3 and in the decoupled or actuation position in FIG. 4.

For an actuation of the decoupling element, the actuating element 44 is actuated such that it is pulled from the axle 16 out of the position illustrated in FIG. 1 and FIG. 3 into the position illustrated in FIG. 2 and FIG. 4, respectively. This is illustrated by the arrow 48 in FIGS. 2 and 4. By actuating the actuating element 44 the displacement element 38 in FIG. 1 is displaced to the right into the position illustrated in FIG. 2. This causes the at least three connecting elements 42 distributed over the circumference to be taken along. For this purpose the connecting elements 42 have a convexly shaped protrusion 50 respectively engaging into a concavely shaped recess 52 in the displacement element 40. The connecting elements 42 are pivotably retained in the recesses 52 by means of a spring wire or an O-ring 54.

The connecting elements 42 are arranged at least for the greater part in openings 56 of the sleeve 34 of the axle 16. In the rest position (FIGS. 1 and 3), an outer side of the connecting elements 42 does not or only slightly protrude beyond an outer shell surface 58 of the sleeve 34.

Thus, by actuating the decoupling element, the connecting elements 42 are pivoted out into the actuation position (FIGS. 2 and 4) when the displacement element 40 is displaced. This is achieved by the fact that the connecting elements in FIGS. 1 and 3 are also moved to the right and are pivoted outward by an abutment or decoupling surface 60. The decoupling surface 60 is the border of the opening 56 on which the front faces 62 of the connecting elements 42 abut. As the connecting elements 42 in FIGS. 1 and 3 to the right, the inclination of the decoupling surfaces 60 cause the connecting elements 42 to be pivoted out into the actuation position (FIGS. 2 and 4).

After the connecting elements 42 have been pivoted out, they contact a radially inward directed shoulder ring 64 (FIGS. 1 and 2). The shoulder ring 64 is fixedly connected with the annular gear 30, in particular formed integrally with the same. Moving the decoupling element 38 further in the direction of the arrow 48 causes the annular gear 30 in FIGS. 1 and 2 to be moved to the right in the direction of an arrow 66. Thereby, the two annular gears 28, 30 are decoupled.

To return the decoupling element 38 to the rest position, and thus to return the two annular gears 28, 30 to the coupled position, it is merely necessary to release the actuating mechanism that is arranged in particular on the handlebar. Due to the spring element 46, the displacement element 40 is automatically pushed back into the rest position illustrated in FIGS. 1 and 3. Thereby, the connecting elements 42 slide back into the opening 56. This causes a release of the annular gear 30. The same is then pushed into the coupled position by the spring plate 32, so that a power transmission is again given between the sprocket carrier 14 and the hub body 10 via the freewheel mechanism 26.

While various embodiments were provided in the foregoing description, those skilled in the art may make modifications and alterations to these embodiments without departing from the scope and spirit of the disclosure. For example, it is to be understood that this disclosure contemplates that, to the extent possible, one or more feature of any embodiment can be combined with one or more features of any other embodiment. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A rear hub comprising:
   a hub body rotatably supported on a hub axle,
   a sprocket carrier rotatably supported on the hub axle, and
   a freewheel mechanism for axially coupling the hub body and the sprocket carrier,
   further comprising a decoupling element for decoupling the hub body and the sprocket carrier,
   wherein the decoupling element is actuated by a manual actuating element which is connected with an actuating mechanism on a bicycle handlebar.

2. The rear hub of claim 1, wherein the freewheel mechanism has two freewheel elements adapted to be disengaged by the decoupling element for decoupling the hub body and the sprocket carrier.

3. The rear hub of claim 1, wherein the freewheel mechanism comprises at least one annular gear with axially arranged teeth.

4. The rear hub of claim 3, wherein the decoupling element displaces one of the annular gears in an axial direction for decoupling.

5. The rear hub of claim 1, wherein the hub axle, in the form of a quick-release axle, fixes the hub body and the sprocket carrier to dropout ends of a bicycle rear frame structure.

6. The rear hub of claim 5, wherein the axle has an axle body with a cavity for receiving the decoupling element.

7. The rear hub of claim 3, wherein the decoupling element comprises at least one connecting element which, when actuated, acts on the freewheel mechanism to displace one of the annular gears in an axial direction.

8. The rear hub of claim 7, wherein the at least one connecting element is pivotable.

9. The rear hub of claim 8, wherein the at least one connecting element is pivotable from a rest position to an actuation position by actuating the actuating element.

10. The rear hub of claim 7, wherein the decoupling element comprises a displacement element connected with the at least one connecting element, wherein a displacement of the displacement element causes a pivoting of the at least one connecting element.

11. The rear hub of claim 10, wherein the displacement element is displaceably arranged in a cavity of the hub axle.

12. The rear hub of claim 10, wherein the displacement element is connected with the actuating element for displacement.

13. The rear hub of claim 7, wherein the hub axle has at least one opening to allow a pivoting of the at least one connecting element into an actuation position.

14. The rear hub of claim 13, wherein the at least one connecting element, when in a rest position, is arranged in the at least one opening.

15. The rear hub of claim 10, wherein the displacement element is connected with a spring element for retaining the displacement element in a rest position.

16. A bicycle axle for fixing a hub body and a sprocket carrier to dropout ends of a bicycle rear frame structure, the hub and the carrier being connected with each other via a freewheel mechanism, comprising:
    an axle body, and
    a cavity provided in the axle body,
    wherein a decoupling element for axially decoupling the hub body and the sprocket carrier is provided in the cavity, and
    wherein the decoupling element is actuated by a manual actuating element which is connected with an actuating mechanism on a bicycle handlebar.

17. The bicycle axle of claim 16, wherein the decoupling element comprises at least one connecting element which, when actuated, acts upon the freewheel mechanism to displace one of at least two annular gears in an axial direction.

18. The bicycle axle of claim 17, wherein the at least one connecting element is pivotable.

19. The bicycle axle of claim 18, wherein the at least one connecting element is pivotable from a rest position to an actuation position by actuating an actuating element.

20. The bicycle axle of claim 17, wherein the decoupling element comprises a displacement element connected with the at least one connecting element, wherein a displacement of the displacement element causes a pivoting of the at least one connecting element.

21. The bicycle axle of claim 20, wherein the displacement element is displaceably arranged in the cavity of the axle body.

22. The bicycle axle of claim 20, wherein the displacement element is connected with an actuating element for displacement.

23. The bicycle axle of claim 20, wherein the displacement element is connected with a spring element for retaining the displacement element in a rest position.

24. The bicycle axle of claim 17, wherein the bicycle axle has at least one opening to allow a pivoting of the at least one connecting element into an actuation position.

25. The bicycle axle of claim 24, wherein the at least one connecting element, when in a rest position, is arranged in the at least one opening.

26. The bicycle axle of claim 16, wherein the decoupling element is connected with an actuating element which is connected with an actuating mechanism on a bicycle handlebar.

27. A rear hub comprising:
    a hub body rotatably supported on a hub axle,
    a sprocket carrier rotatably supported on the hub axle, and
    a freewheel mechanism for coupling the hub body and the sprocket carrier,
    further comprising a decoupling element for decoupling the hub body and the sprocket carrier,
    wherein the decoupling element comprises at least one connecting element which, when actuated, acts on the freewheel mechanism to displace an annular gear in an axial direction, and
    wherein the at least one connecting element is pivotable.

* * * * *

UNITED STATES PATENT AND TRADEMARK OFFICE
CERTIFICATE OF CORRECTION

PATENT NO. : 10,189,306 B2  
APPLICATION NO. : 15/238858  
DATED : January 29, 2019  
INVENTOR(S) : Vincenz Thoma et al.

Page 1 of 1

It is certified that error appears in the above-identified patent and that said Letters Patent is hereby corrected as shown below:

On the Title Page

Item (54) and in the Specification, Column 1, Line 1, delete "BICYCLIC" and insert -- BICYCLE --

Signed and Sealed this
Sixteenth Day of April, 2019

Andrei Iancu
*Director of the United States Patent and Trademark Office*